(12) United States Patent
Niiyama et al.

(10) Patent No.: US 7,547,140 B2
(45) Date of Patent: Jun. 16, 2009

(54) ELECTRONIC THERMOMETER

(75) Inventors: Shigeto Niiyama, Kyoto (JP); Masaki Tomioka, Kyoto (JP); Akitoshi Miki, Takatsuki (JP); Takao Terada, Osaka (JP)

(73) Assignee: OMRON Healthcare Co., Ltd., Kyoto (JP)

( * ) Notice: Subject to any disclaimer, the term of this patent is extended or adjusted under 35 U.S.C. 154(b) by 3 days.

(21) Appl. No.: 11/804,533

(22) Filed: May 17, 2007

(65) Prior Publication Data

US 2007/0274370 A1 Nov. 29, 2007

(30) Foreign Application Priority Data

May 18, 2006 (JP) .............................. 2006-139143

(51) Int. Cl.
*G01K 1/00* (2006.01)
*G01K 7/00* (2006.01)
*G01K 9/00* (2006.01)
*A61B 5/00* (2006.01)
*G08B 3/00* (2006.01)

(52) U.S. Cl. ........................ 374/208; 374/163; 374/141; 600/549; 340/391.1; 340/388.4; 340/388.1

(58) Field of Classification Search ................ 374/208, 374/163, 141; 600/549; 340/391.1, 388.4, 340/388.1, 384.6
See application file for complete search history.

(56) References Cited

U.S. PATENT DOCUMENTS 3,746,898 A * 7/1973 Austin et al. ................ 310/326
4,374,377 A    2/1983 Saito et al.
4,579,464 A * 4/1986 Yamazaki et al. ........... 374/163
4,701,749 A * 10/1987 Barnes ..................... 340/384.6
4,810,997 A * 3/1989 Kudo et al. ............... 340/384.6
5,444,324 A    8/1995 Priest et al.
5,923,258 A * 7/1999 Tseng ........................ 340/584
2003/0231696 A1* 12/2003 Kihira et al. ................ 374/163

FOREIGN PATENT DOCUMENTS

| EP | 1371959 | 12/2003 |
|---|---|---|
| GB | 1359624 | 7/1974 |
| JP | 11248546 | 9/1999 |
| JP | 2004-020241 | 1/2004 |

OTHER PUBLICATIONS

European patent application No. 07009735.7-2209, European Search Report dated Sep. 5, 2007.

* cited by examiner

*Primary Examiner*—Gail Verbitsky
*Assistant Examiner*—Mirellys Jagan
(74) *Attorney, Agent, or Firm*—Weaver Austin Villeneuve & Sampson LLP

(57) ABSTRACT

The electronic thermometer of this invention includes a supporting portion which supports the vicinity of the periphery on one face of a vibration plate, and a buzzer cover having flexibility for pressing the vibration plate against the supporting portion by pressing the vicinity of the periphery of the other face of the vibration plate and further includes a mechanism which presses the vicinity of the center of the buzzer cover on an opposite side to a side provided with the vibration plate in the buzzer cover so as to flex the buzzer cover, thereby pressing the vicinity of the periphery on the other face of the vibration plate with elastic reaction force of the buzzer cover.

5 Claims, 12 Drawing Sheets

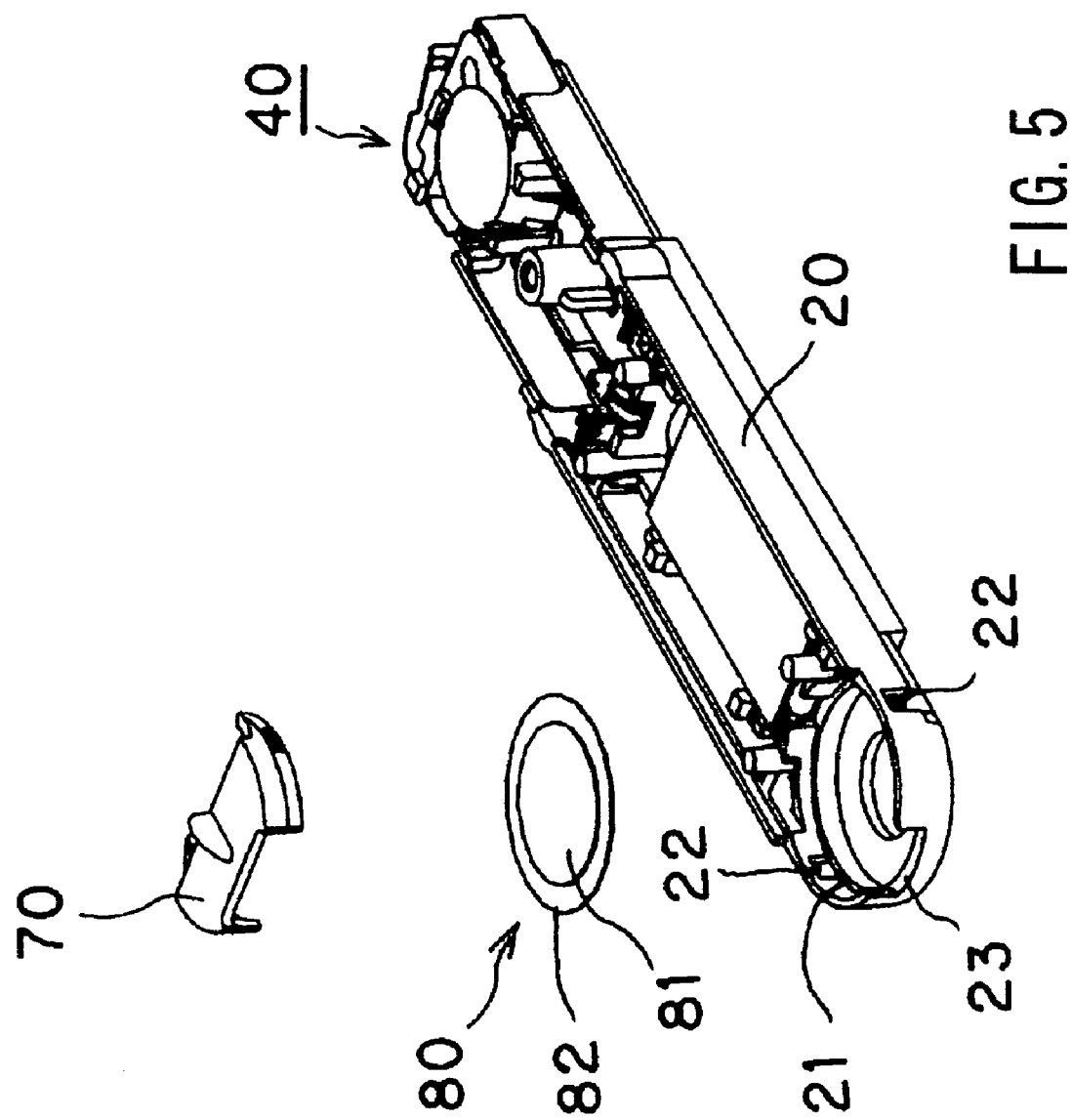

ELECTRONIC THERMOMETER

This application claims priority on Japanese Patent Application 2006-139143 filed May 18, 2006.

BACKGROUND OF THE INVENTION

1. Field of the Invention

The present invention relates to an electronic thermometer.

2. Description of the Related Art

Conventionally, there has been known an electronic thermometer having a buzzer for notifying user of temperature measurement end time or the like. For such an electronic thermometer, increasing of the sound volume in a small size buzzer is a technical problem.

As art for increasing the sound volume of such a small size buzzer, there have been known arts of forming a resonant space which resonates with vibration sound of a vibration plate provided on the buzzer, and providing a case or the like for supporting the buzzer with a sympathetic vibrating portion which vibrates sympathetically with vibration of the vibration plate (see Japanese Patent Application Laid-Open No. 2004-20241). To exert the resonance action and sympathetic vibration action effectively, it is indispensable to vibrate the vibration plate provided on the buzzer according to a setting. Then, to vibrate this vibration plate according to the setting, the buzzer (vibration plate) needs to be fixed accurately at a desired position. Therefore, in order to increase the sound volume in a small size buzzer, buzzer fixing structure is an important factor.

An example of the buzzer fixing structure in a conventional electronic thermometer will be described with reference to FIG. 12. FIG. 12 is a sectional view of an electronic thermometer of a conventional example. FIG. 12 shows a section of a portion perpendicular to the longitudinal direction of the electronic thermometer and provided with a buzzer.

In an electronic thermometer 200 of this conventional example, an inner case 220 having various major components is pressed into an outer case 211 constructing its appearance and having waterproof property. The inner case 220 is provided with a buzzer cover 270 and the buzzer 280 is positioned and fixed by this buzzer cover 270 and the inner case 220. The buzzer 280 has a piezoelectric plate which is provided integrally on a vibration plate. Then, the vibration plate of this buzzer 280 is fixed such that it is sandwiched from both face sides by a supporting portion 221 provided in the inner case 220 and a pair of pressing portions 273 provided on the buzzer cover 270 in the vicinity of an edge of the vibration plate.

The buzzer cover 270 is provided with a pair of projecting portion 272 which makes contact with the inner wall face of the outer case 211 with the inner case 220 mounted on the outer case 211. The pair of the projecting portion 272 makes contact with the inner wall face of the outer case 211 and the pair of the pressing portions 273 makes contact with the vibration plate of the buzzer 280, so that the buzzer cover 270 is fixed such that it is sandwiched form both face sides. As a consequence, the vibration plate of the buzzer 280 is positioned and fixed such that it is sandwiched from the both face sides by the buzzer cover 270 and the inner case 220.

When the buzzer 280 is positioned and fixed, resonant space R is formed in a region surrounded by the buzzer 280 and the inner case 220. Then, when the resonant space R resonates with vibration sound of the vibration plate of the buzzer 280 so that the inner case 220 vibrates sympathetically with vibration of the vibration plate 220, a large sound volume can be produced even if the buzzer 280 is small.

However, to generate the resonance action and sympathetic vibration action effectively, the vibration plate of the buzzer 280 needs to be fixed accurately at a desired position (a designed position). That is, the resonant space R is formed under a condition that the resonance action occurs when the vibration plate of the buzzer 280 is vibrated such that its central portion is vibrated most largely and the characteristic frequency of the inner case 220 is set so that the sympathetic vibration action occurs. Thus, unless the vibration plate of the buzzer 280 is fixed accurately at a desired position, a position vibrated most largely of the vibration plate is shifted from its central portion, so that the resonance action and sympathetic vibration action become insufficient.

To fix the vibration plate of the buzzer 280 accurately at a desired position, the dimensional accuracy of the outer case 211, the inner case 220, the buzzer cover 270, and the vibration plate of the buzzer 280 itself, and assembly accuracy of these members need to be intensified. The reason is that the positioning and fixing accuracy of the vibration plate of the buzzer 280 is almost determined by the dimension of an insertion hole (insertion hole in which the inner case 220 or the buzzer cover 270 is to be inserted) formed in the outer case 211, the height of the inner case 220 (distance from the bottom face of the inner case 220 up to the surface of the supporting portion 221 in FIG. 12), the thickness of the vibration plate portion of the buzzer 280, and the height (distance in the height direction from a front end of the projecting portion 272 to a front end of the pressing portion 273) of the buzzer cover 270.

Thus, if dimensional error between the left side portion and the right side portion of each member is large in a condition in which respective members are assembled in FIG. 12, an end portion of the buzzer 280 is nipped strongly so that the nipping of the other end portion is weakened. Therefore, when the vibration plate of the buzzer 280 is vibrated, the position vibrated most largely is shifted to the other end portion. Consequently, the resonance action and sympathetic vibration action become insufficient. The factor for accelerating the dimensional error includes a factor due to the dimensional accuracy of each of the members and a factor due to the assembly accuracy of each of the members.

In the structure shown in FIG. 12, the dimensional allowance of a distance in the height direction from the front end of the projecting portion 272 of the buzzer cover 270 to the front end of the pressing portion 273 needs to be 0.1 mm or less when the respective members are assembled.

As described above, in the conventional structure, the dimensional accuracy of each member and the assembly accuracy of each member need to be intensified although it is capable of generating a large sound volume with the small buzzer 280. For the reason, the dimensional accuracy of a mold for forming each member needs to be intensified and the dimensional control and assembly accuracy of each member needs to be made strict. This leads to increase of manufacturing cost.

SUMMARY OF THE INVENTION

An object of the present invention is to provide an electronic thermometer capable of fixing a buzzer accurately at a desired position when the dimensional accuracy or assembly accuracy of each member is dropped.

The present invention has adopted following means to solve the above-described object.

An electronic thermometer of the present invention includes a temperature sensor which detects a temperature; a display portion which displays a measured temperature based on data detected by the temperature sensor; a buzzer which makes sound at least when the measurement is ended; and a control circuit including a circuit which controls the buzzer to make sound by determining a measurement end time and a circuit which processes data detected by the temperature sensor and displays the measurement temperature obtained by the processing on the display portion, wherein the buzzer includes a vibration plate, the vibration plate being fixed such that it is nipped from both face sides in the vicinity of the periphery of the vibration plate, the electronic thermometer including a supporting portion which supports the vicinity of the periphery on one face of the vibration plate, and a pressing member having flexibility for pressing the vibration plate against the supporting portion by pressing the vicinity of the periphery of the other face of the vibration plate and further including a mechanism which presses the vicinity of the center of the pressing member on an opposite side to a side provided with the vibration plate in the pressing member so as to flex the pressing member, thereby pressing the vicinity of the periphery on the other face of the vibration plate with elastic reaction force of the pressing member.

In the electronic thermometer of the present invention, the pressing member is flexed by pressing the vicinity of the center of the pressing member having flexibility, so that the vibration plate is pressed against the supporting portion which supports the vibration plate of the buzzer with elastic reaction force of the pressing member. Consequently, even if each member concerning fixing of the vibration plate has a dimensional error, the dimensional error is absorbed by flexure deformation of the pressing member so as to fix the vibration plate (buzzer) accurately at a desired position.

Preferably, the electronic thermometer wherein the pressing member includes a pair of pressing portions for pressing the vibration plate at two points on both ends in the width direction perpendicular to the longitudinal direction of an electronic thermometer main body and a projecting portion which projects to an opposite side to the pressing portion in the vicinity of the center of the pressing member, and the projecting portion makes contact with the inner wall face of the casing in a condition in which the pressing member is mounted within a casing of the electronic thermometer so that the pressing member is flexed by a reaction force thereof.

Preferably, the electronic thermometer wherein the vibration plate is of disc shape and the pressing member includes a substantially cylindrical pressing portion which presses the vibration plate at position along the periphery of the vibration plate and a projecting portion which projects to an opposite side to the pressing portion in the vicinity of the center of the pressing member, and the projecting portion makes contact with the inner wall face of the casing in a condition in which the pressing member is mounted within a casing of the electronic thermometer so that the pressing member is flexed by a reaction force thereof.

Furthermore, preferably, the electronic thermometer wherein the inner wall face of a casing of the electronic thermometer is provided with a projecting portion which when the pressing member is mounted within the casing, presses the vicinity of the center of the pressing member so as to flex the pressing member.

Preferably, the electronic thermometer wherein the supporting portion which supports the vibration plate is provided on the case which forms resonant space resonating with vibration sound of the vibration plate, and the case has a sympathetic vibrating portion which vibrates sympathetically with vibration of the vibration plate and a cutout for intensifying the sympathetic vibration effect of the sympathetic vibrating portion at a position which does not obstruct formation of the resonant space.

Consequently, the vibration plate can be fixed accurately at a desired position of the vibration plate and further, a larger sound volume can be generated with even a small buzzer.

As described above, according to the present invention, the buzzer can be fixed accurately at a desired position even if the dimensional accuracy or assembly accuracy of each member is dropped.

BRIEF DESCRIPTION OF THE DRAWINGS

FIG. 5 is a perspective view showing a condition in which a buzzer and a buzzer cover (pressing member) are incorporated into the inner case according to the first embodiment of the present invention;

DETAILED DESCRIPTION OF THE PREFERRED EMBODIMENTS

The preferred embodiments of the present invention will be described in detail with reference to the accompanying drawings. However, the dimension, material, shape, and relative arrangement of components described in the embodiment do not restrict the scope of the present invention to only those unless described specifically.

First Embodiment

Figure 1:
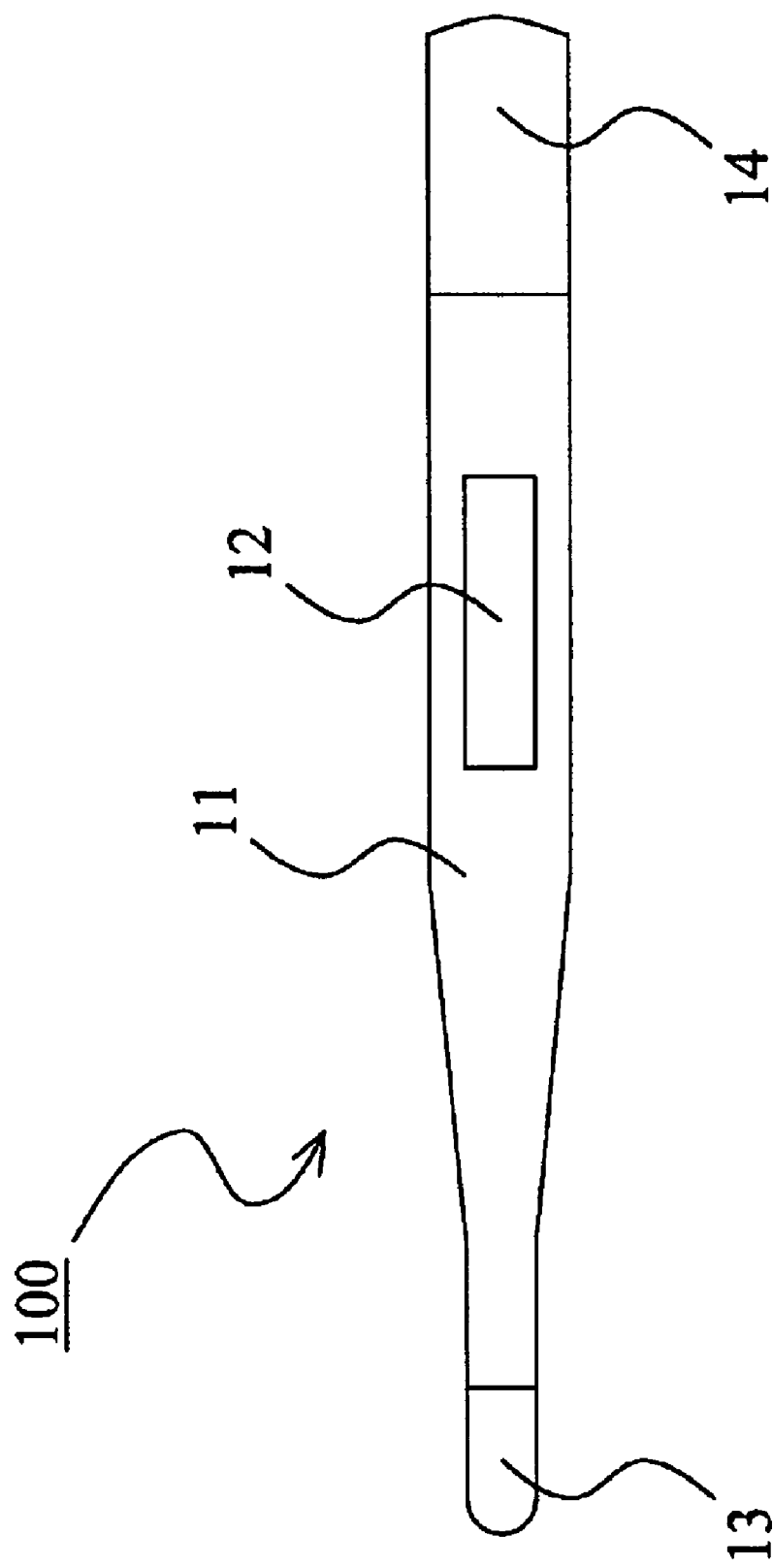
FIG. 1 is a plan view of an electronic thermometer according to a first embodiment of the present invention.
Figure 2:
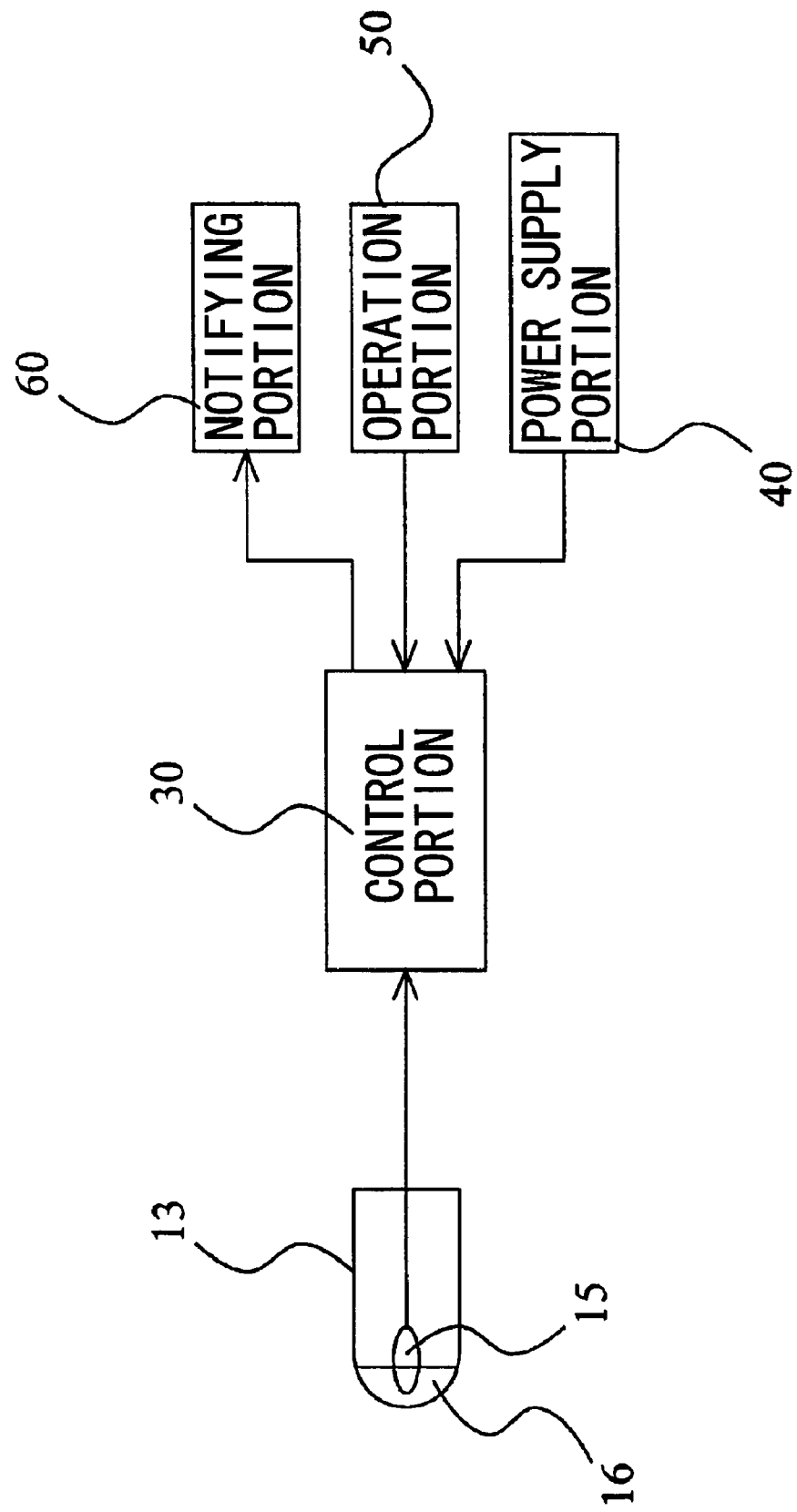
FIG. 2 is a block diagram of the electronic thermometer according to the first embodiment of the present invention.
Figure 3:
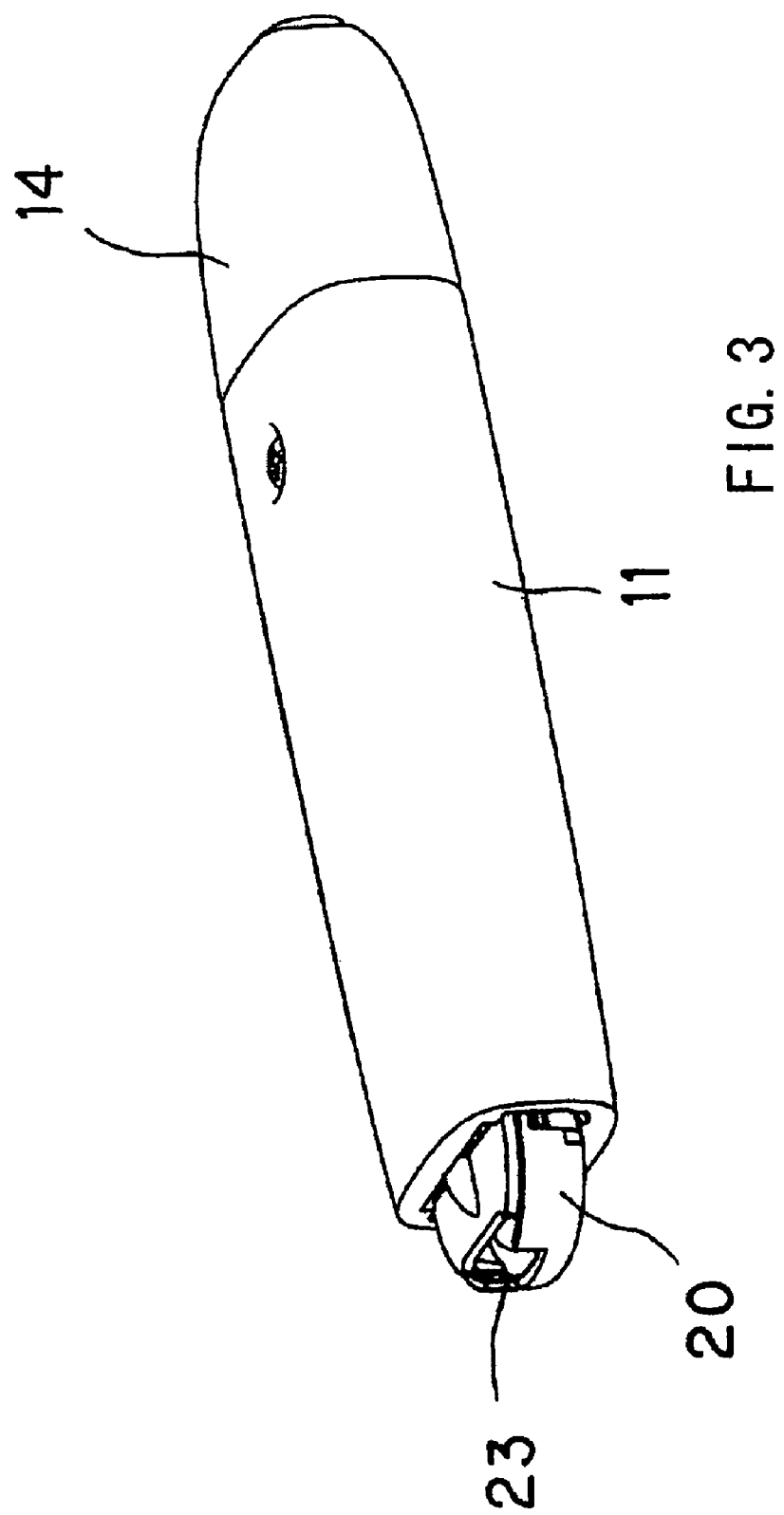
FIG. 3 is a partially broken perspective view of the electronic thermometer according to the first embodiment of the present invention.
Figure 4:
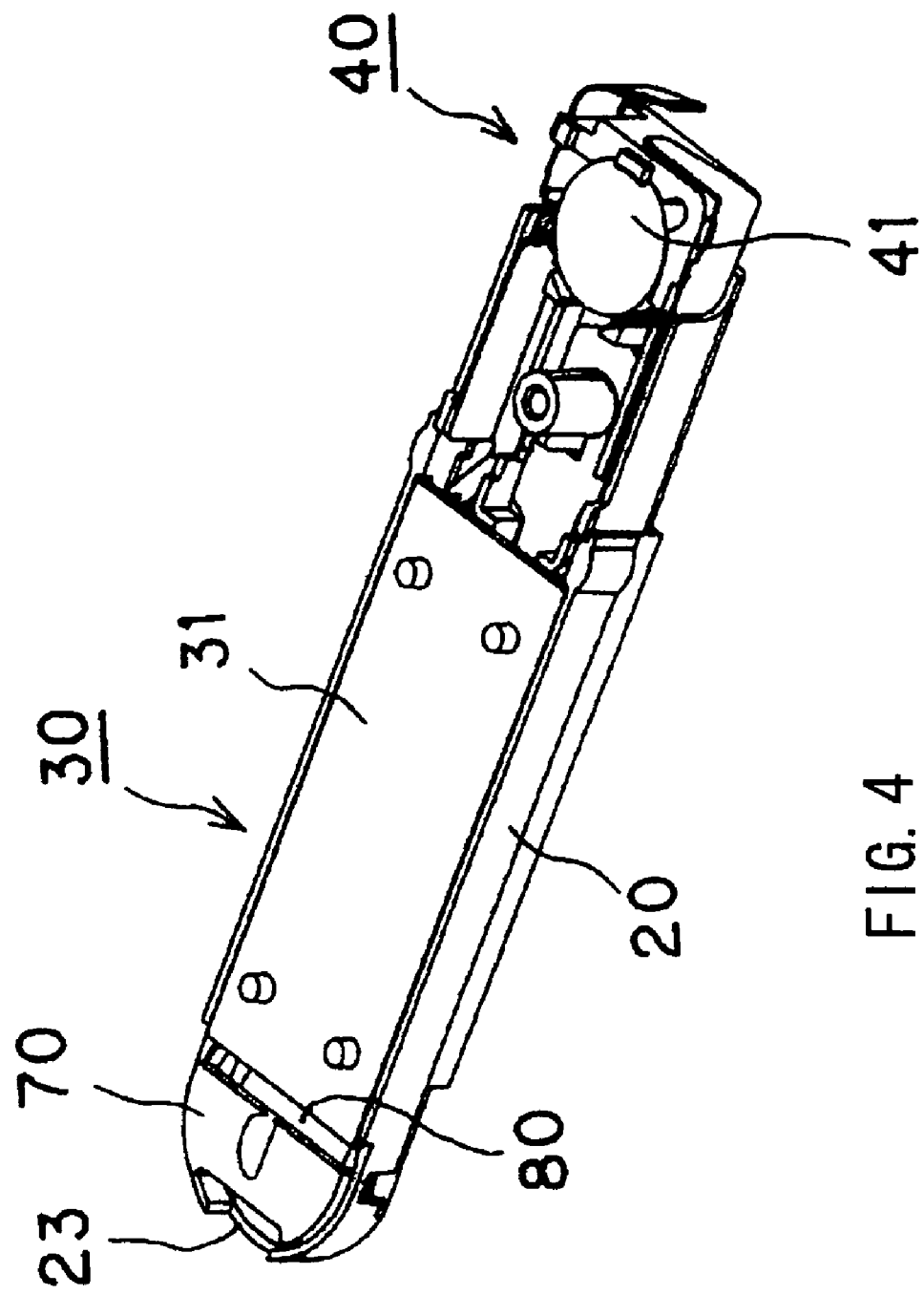
FIG. 4 is a perspective view showing a condition in which respective components are incorporated in an inner case according to the first embodiment of the present invention.
Figure 6B:
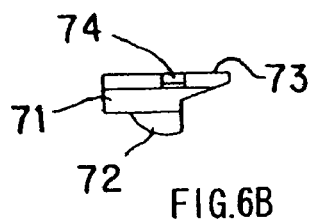
FIG. 6B is a rear view showing the buzzer cover according to the first embodiment of the present invention.
Figure 6D:
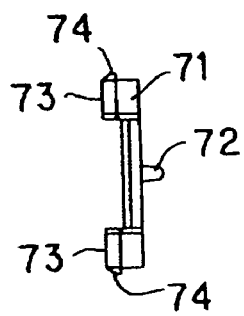
FIG. 6D is a side view showing the buzzer cover according to the first embodiment of the present invention.
Figure 6A:
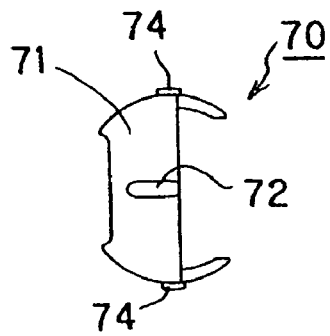
FIG. 6A is a plan view showing the buzzer cover according to the first embodiment of the present invention.
Figure 6E:
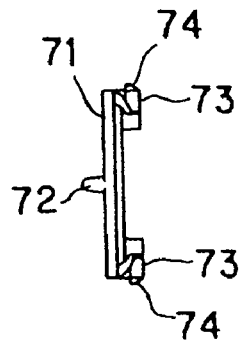
FIG. 6E is a side view showing the buzzer cover according to the first embodiment of the present invention.
Figure 6C:
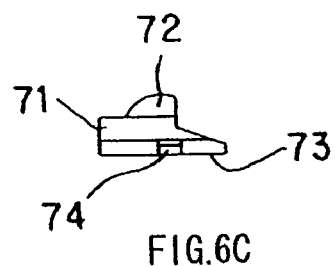
FIG. 6C is a front elevational view showing the buzzer cover according to the first embodiment of the present invention.
Figure 6F:
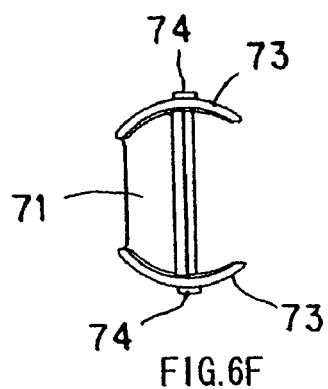
FIG. 6F is a bottom view showing the buzzer cover according to the first embodiment of the present invention.
Figure 7A:
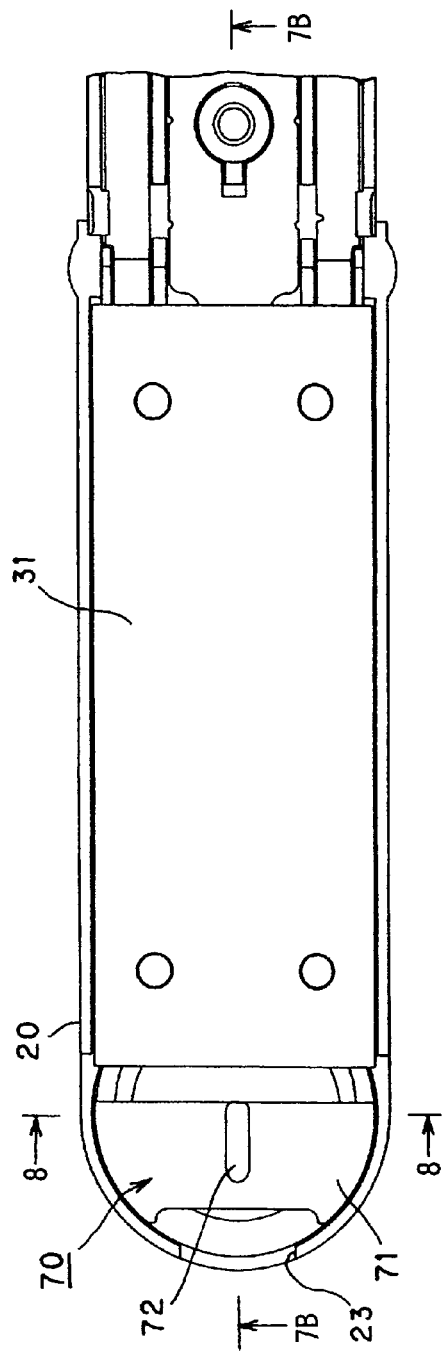
FIG. 7A is a plan view showing the fixing portion of the buzzer according to the first embodiment of the present invention.
Figure 7B:
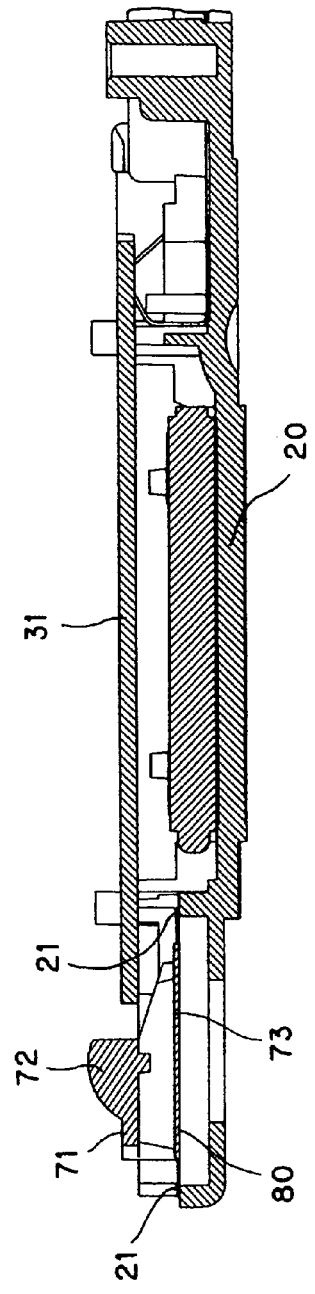
FIG. 7B is a sectional view (sectional view taken along the line 7B-7B of FIG. 7A) showing the fixing portion of the buzzer according to the first embodiment of the present invention.
Figure 8:
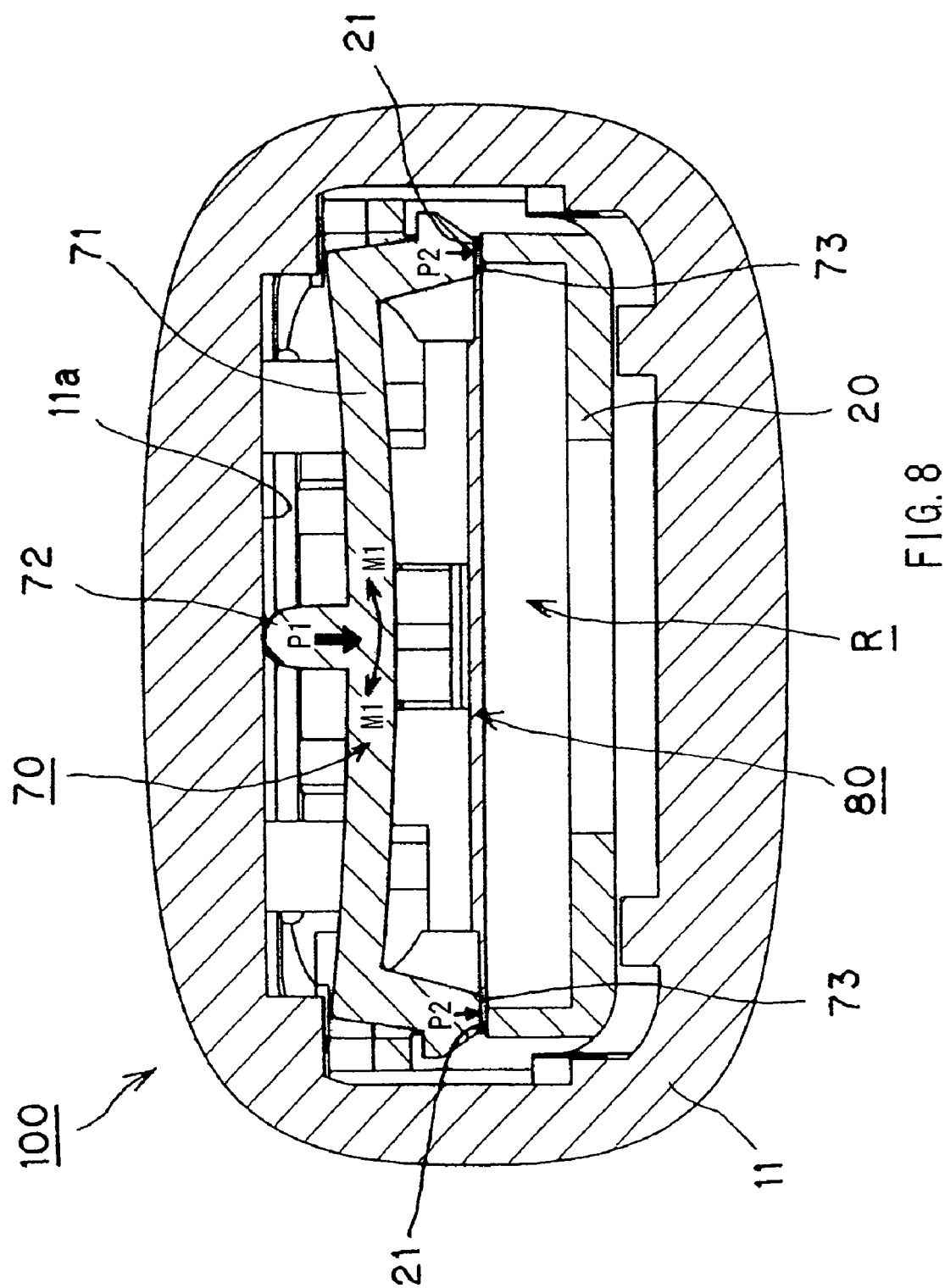
FIG. 8 is a sectional view perpendicular to the longitudinal direction of the electronic thermometer according to the first embodiment of the present invention.
Figure 9:
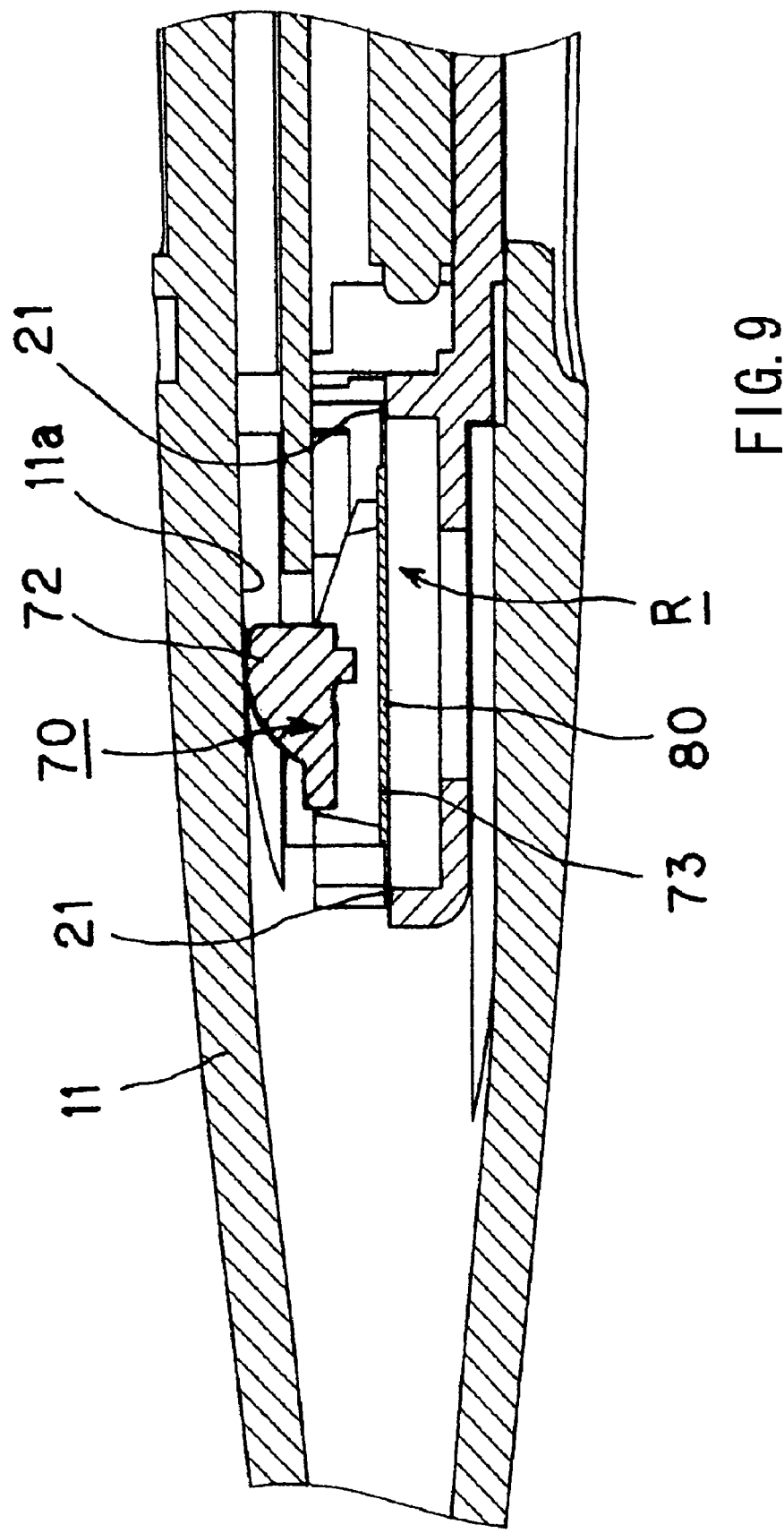
FIG. 9 is part of the sectional view in the longitudinal direction of the electronic thermometer according to the first embodiment of the present invention.

The electronic thermometer according to the first embodiment of the present invention will be described with reference to FIGS. 1 to 9. FIG. 1 is a plan view of an electronic thermometer according to the first embodiment of the present invention. FIG. 2 is a block diagram of the electronic thermometer according to the first embodiment of the present invention. FIG. 3 is a partially broken perspective view of the electronic thermometer according to the first embodiment of the present invention. FIG. 4 is a perspective view showing a condition in which respective components are incorporated in an inner case according to the first embodiment of the present invention. FIG. 5 is a perspective view showing a condition in which a buzzer and a buzzer cover (pressing member) are incorporated into the inner case according to the first embodiment of the present invention. FIG. 6 is a 6-view diagram of the buzzer cover according to the first embodiment of the present invention. FIG. 6A is a plan view showing the buzzer cover. FIG. 6B is a rear view showing the buzzer cover. FIG. 6C is a front elevational view showing the buzzer cover. FIG. 6D is a side view showing the buzzer cover. FIG. 6E is a side view showing the buzzer cover. FIG. 6F is a bottom view showing the buzzer cover. FIG. 7 is a diagram showing the fixing structure of the buzzer according to the first embodiment of the present invention. FIG. 7A is a plan view showing the fixing portion of the buzzer. FIG. 7B is a sectional view showing the fixing portion of the buzzer. FIG. 7B is a sectional view taken along the line 7B-7B of FIG. 7A. FIG. 8 is a sectional view perpendicular to the longitudinal direction of the electronic thermometer according to the first embodiment of the present invention. In the meantime, the inner case, the buzzer, and the buzzer cover in FIG. 8 correspond to a sectional view taken along the line 8-8 in FIG. 7. FIG. 9 is part of the sectional view in the longitudinal direction of the electronic thermometer according to the first embodiment of the present invention.

(Outline of Electronic Thermometer)

Particularly, the outline of the electronic thermometer according to the first embodiment of the present invention will be described with reference to FIGS. 1 to 4. An electronic thermometer 100 according to the first embodiment of the present invention includes an outer case (casing) 11 which forms its appearance and has waterproof property, a display portion 12 provided on the outer case 11, a SUS cap 13 which serves as a temperature detecting portion to be brought into contact with the armpit or the tongue bottom portion, and a battery cover 14 for use in replacement of a battery.

As shown in FIG. 4, the respective major components of the electronic thermometer 100 are attached to the inner case 20. The inner case 20 accommodating the respective major components is mounted in the outer case 11. FIG. 3 shows a perspective view of a condition in which part on the SUS cap 13 side of the outer case 11 is cut out with the inner case 20 mounted on the outer case 11.

As shown in FIG. 4, the inner case 20 includes a control board 31 which is a major component of the control portion 30, a battery 41 which is a major component of a power supply portion 40, a buzzer 80, and a buzzer cover 70 as a pressing member for positioning and fixing the buzzer. As shown in FIG. 2, a temperature sensor 15 which detects the temperature of a measuring object portion is fixed with adhesive agent 16 in the SUS cap 13.

The control portion 30 includes a function of being supplied with electricity from the power supply portion 40 and inputting a signal from an operation portion 50 or a signal from the temperature sensor 15, and a function of outputting a signal to a notifying portion 60. The operation portion 50 is the portion provided to operate the electronic thermometer 100 to measure the temperature of user and is constituted of for example a push button. In this embodiment the notifying portion 60 corresponds to the display portion 12 which displays a measured temperature (body temperature), etc. and the buzzer 80 which notifies measurement end time.

The control portion 30 includes a circuit which determines measurement end time and controls the buzzer to make a sound and a circuit which processes data detected by the temperature sensor 15 and displays the measurement temperature obtained by the processing on the display portion 12. In the meantime, examples of a method for determining the measurement end time include a method of measuring a passage time since a measurement start signal is sent from the operation portion 50 and of determining a time when a predetermined time is reached as the measurement end time.

(Fixing Structure of Buzzer)

Particularly, the fixing structure of the buzzer 80 according to the first embodiment of the present invention will be described with reference to FIGS. 5 to 9.

The buzzer 80 of this embodiment has a structure in which a piezoelectric plate 81 is provided integrally on a vibration plate 82. The vibration plate 82 and the piezoelectric plate 81 are of disk type and fixed integrally such that their centers align. In this embodiment, the vibration plate 82 is fixed at two positions across the center in the vicinity of the periphery of the vibration plate 82 so that the center of the circle of the vibration plate 82 vibrates most largely. More specifically, the vibration plate 82 is fixed such that it is nipped from both face sides by the inner case 20 and the buzzer cover 70. Hereinafter, the fixing structure of this buzzer 80 (vibration plate 82) will be described in detail.

The inner case 20 includes a supporting portion 21 which supports one face in the vicinity of the periphery of the vibration plate 82, a pair of engaging holes 22 which engages the buzzer cover 70 therewith, and a cutout portion 23. The supporting portion 21 is constructed of an annular face which is fitted to one face of the vibration plate 82 along the periphery of the vibration plate 82. The engaging holes 22 are provided in each of both side walls of the inner case 20. Further, by providing the cutout portion 23 in part of the side wall of the inner case 20, rigidity of the side wall is dropped so as to make the side walls on both sides across the cutout portion 23 easy to vibrate. In the meantime, the resonant space R is formed by space surrounded by the buzzer 80 and the inner case 20 in a condition in which the buzzer 80 is supported by the supporting portion 21. The aforementioned pair of the engaging holes 22 and cutout portion 23 are provided on the top face side (opposite side to the resonant space R) relative to the supporting portion 21 not to obstruct formation of this resonant space R.

The buzzer cover 70 as a pressing member is constituted of such material as resin, having flexibilty. This buzzer cover 70 includes a plate-like main body portion 71, a projecting portion 72 provided in the center of the main body portion 71, a pair of pressing portions 73 provided on both end sides of the main body portion 71, and a pair of engaging pieces 74 provided on the side face sides of a pair of the pressing portions 73. The pair of the pressing portions 73 are portions for pressing the vibration plate 82 at two positions on both ends in the width direction perpendicular to the longitudinal direction of the electronic thermometer main body and its bottom face is of circular shape along the periphery of the vibration plate 82. Then, the projecting portion 72 is provided to project to an opposite side to the pair of the pressing portions 73. The pair of the engaging pieces 74 is constructed to engage with the pair of the engaging holes 22 provided on the inner case 20. By engaging the pair of the engaging pieces 74 with the pair of the engaging holes 22, the buzzer cover 70 is positioned and fixed in the inner case 20.

With the above-described structure, if the buzzer cover 70 is fixed to the inner case 20 with the buzzer 80 mounted on the supporting portion 21 of the inner case 20, the buzzer 80 (more specifically, the vibration plate 82 of the buzzer 80) turns into a state in which it is nipped by the supporting portion 21 of the inner case 20 and the pair of the pressing portions 73 of the buzzer cover 70. FIG. 7 shows that state. In the meantime, the buzzer 80 is nipped loosely by the supporting portion 21 and the pressing portion 73 in a condition in which the buzzer cover 70 is only fixed to the inner case 20.

Then, the inner case 20 is mounted in the outer case 11 with other components (control board 31 and the battery 41 and so on) attached to the inner case 20. FIGS. 8 and 9 show a state in which the inner case 20 is mounted in the outer case 11. When the inner case 20 is mounted in the outer case 11, the projecting portion 72 of the buzzer cover 70 makes contact with an inner wall face 11a of the outer case 11. For the reason, the projecting portion 72 receives a reaction force P1 in a downward direction in FIGS. 8 and 9 (direction in which the buzzer 80 is equipped) from the inner wall face 11a. Consequently, the vicinity of the center of the main body portion 71 of the buzzer cover 70 is pressed so that the main body portion 71 is flexed curvedly (see an arrow M1 in FIG. 8). Then, the pair of the pressing portions 73 presses the vicinity of the periphery of the vibration plate 82 of the buzzer 80 by an elastic reaction force due to this flexure deformation.

As described above, the vibration plate 82 of the buzzer 80 is supported by the supporting portion 21 of the inner case 20 in the vicinity of the periphery of one face thereof (portion having a specific width along the periphery) while the vicinity of the periphery of the other face (two positions on both ends in the width direction perpendicular to the longitudinal direction of the electronic thermometer main body) is pressed by the pair of the pressing portion 73 of the buzzer cover 70. Therefore, the vibration plate 82 is fixed strongly such that it is nipped from both face sides near the periphery of the vibration plate 82.

Further, the resonant space R formed by being surrounded by the buzzer 80 and the inner case 20 is set to resonate with vibration sound generated by vibration when the central portion of the vibration plate 82 of the buzzer 80 is vibrated most largely. At least part of the inner case 20 is set to such a characteristic frequency that it vibrates sympathetically when the central portion of the vibration plate 82 of the buzzer 80 is vibrated most largely.

(Advantages of Electronic Thermometer of this Embodiment)

In the electronic thermometer 100 of this embodiment having the above-described structure, the vibration plate 82 of the buzzer 80 is fixed strongly such that it is nipped from both face sides by the supporting portion 21 of the inner case 20 and the pair of the pressing portions 73 in the vicinity of the periphery thereof.

Because the vicinity of the center of the main body portion 71 of the buzzer cover 70 presses the vicinity of the periphery of the vibration plate 82 by the pair of the pressing portion 73 while flexed curvedly when pressed to the side of the buzzer 80, the pressing force of one of the pair of the pressing portions 73 can be equalized with the pressing force of the other one even if a dimensional error occurs in each member (pressing force P2 of each pressing portion 73 is substantially half the reaction force P1 received by the projecting portion 72). This point will be described further in detail.

The positioning/fixing accuracy of the buzzer 80 (vibration plate 82) is affected by the dimensional accuracy of each member concerning fixing of the vibration plate 82 of the buzzer 80 or the assembly accuracy of these members. More specifically, the outer case 11, the inner case 20, the buzzer cover 70, and the vibration plate 82 of the buzzer 80 are members concerning the fixing of the vibration plate 82. However, according to this embodiment, as described above, the vicinity of the center of the main body portion 71 of the buzzer cover 70 presses the vicinity of the periphery of the vibration plate 82 by the pair of the pressing portions 73 while flexed curvedly when pressed to the side of the buzzer 80. Thus, even if the dimensional accuracy or assembly accuracy of each member is low, the buzzer cover 70 (particularly the main body portion 71) is distorted and deformed so that the pressing force of one of the pair of the pressing portions 73 is equalized with the pressing force of the other one. Consequently, the dimensional error can be absorbed by amount corresponding to the flexure deformation of the buzzer cover 70. For example, although conventionally, the dimensional allowance of a distance in the height direction from the front end of the projecting portion 72 on the buzzer cover 70 to the front end of the pressing portion 73 is required to be set to 0.1 mm or less, according to this embodiment, it can be loosened to 0.2 to 0.3 mm.

Even if the dimensional error occurs in each member concerning the fixing of the vibration plate 82 of the buzzer 80 in the condition in which the inner case 20 is mounted in the outer case 11, the pressing force of one of the pair of the pressing portions 73 can be equalized with the pressing force of the other one. Consequently, the buzzer 80 (vibration plate 82) is fixed accurately at a desired position (designed position). Because the vibration plate 82 of the buzzer 80 can be vibrated according to the setting (more specifically, the vibration plate can be vibrated so that the central portion is vibrated most largely), the resonance action and sympathetic vibration action can be exerted more securely. As a consequence, a large sound volume can be generated even if the buzzer 80 is small.

Even if the dimensional accuracy of any member concerning the fixing of the outer case 11, the inner case 20, the buzzer cover 70 and the vibration plate 82 of the buzzer 80 or the assembly accuracy of these members is low, the buzzer 80 (vibration plate 82) can be fixed accurately at a desired position. Accordingly, the dimensional accuracy of a mold for forming these members can be lowered compared with conventionally thereby loosening the dimensional control of these members compared with conventionally. Further, the assembly accuracy also can be lowered compared with conventionally. As a result, manufacturing cost can be reduced.

According to this embodiment, by providing part of the side wall of the inner case 20 with the cutout portion 23, rigidity of the side wall is reduced so as to make each side wall easy to vibrate across the cutout portion 23. Consequently, an effect that at least part of the inner case 20 is vibrated sympathetically when the vibration plate 82 of the buzzer 80 is vibrated is intensified, so that a larger sound volume can be generated even if the buzzer 80 is small.

Second Embodiment

Figure 10:
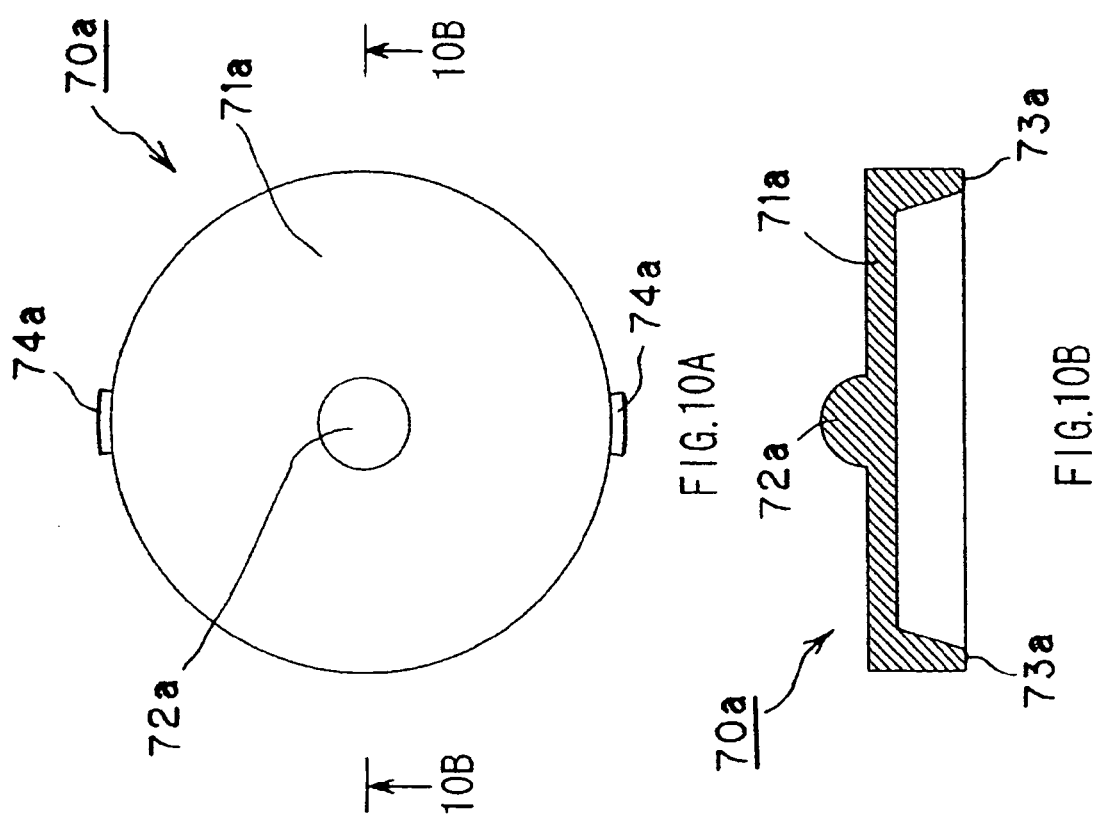
FIG. 10A is a plan view of the buzzer cover according to a second embodiment of the present invention.
FIG. 10B is a sectional view (sectional view taken along the line 10B-10B in FIG. 10A) of the buzzer cover according to the second embodiment of the present invention.

FIG. 10 shows the second embodiment of the present invention. This embodiment indicates a modification of the buzzer cover as the pressing member. Because the other structure and operation are the same as the first embodiment, like reference numerals are attached to like components and description thereof will not be described. FIG. 10 is a schematic diagram of the buzzer cover according to the second embodiment of the present invention. FIG. 10A is a plan view thereof, FIG. 10B is a sectional view (sectional view taken along the line 10B-10B in FIG. 10A) thereof.

A buzzer cover 70a of this embodiment is constituted of such material as resin and has flexibility like the first embodiment. This buzzer cover 70a includes a disk-like main body portion 71a, a projecting portion 72a provided in the center of the main body portion 71a, a substantially cylindrical pressing portion 73a provided along the periphery of the main body portion 71a, and a pair of engaging pieces 74a provided on the side face side of the pressing portion 73a. The pressing portion 73a is a portion which presses the vibration plate 82 and its bottom face is formed in an annular shape along the periphery of the vibrating plate 82. Then, the projecting portion 72a is provided so as to project toan opposite side to the pressing portion 73a. The pair of the engaging pieces 74a is so constructed to engage the pair of the engaging holes 22 provided in the inner case 20. When the pair of the engaging pieces 74a is engaged with the pair of the engaging holes 22, the buzzer cover 70a is positioned and fixed within the inner case 20.

According to this embodiment, when the buzzer cover 70a of this embodiment is fixed in the inner case 20 with the buzzer 80 mounted on the supporting portion 21 of the inner case 20, the buzzer 80 (more specifically the vibration plate 82 of the buzzer 80) is nipped by the supporting portion 21 of the inner case 20 and the substantially cylindrical pressing portion 73a of the buzzer cover 70a.

When the inner case 20 is mounted in the outer case 11, the projecting portion 72a of the buzzer cover 70a makes contact with the inner wall face 11a of the outer case 11. Consequently, the projecting portion 72a receives a reaction force from the inner wall face 11a. As a result, the vicinity of the center of the main body portion 71a of the buzzer cover 70a is pressed so that the main body portion 71a is flexed curvedly. The substantially cylindrical pressing portion 73a presses the vicinity of the periphery of the vibration plate 82 of the buzzer 80 along the periphery thereof by elastic reaction force due to this flexure deformation.

As described above, in this embodiment also, the vicinity of the center of the main body portion 71a of the buzzer cover 70a is pressed to the side of the buzzer 80 and flexed curvedly, so that the substantially cylindrical pressing portion 73a presses the entire periphery of the vibration plate 82. Thus, even if the dimensional accuracy or assembly accuracy of each member concerning the fixing of the vibration plate 82 is low, the buzzer cover 70a (particularly the main body portion 71a) is flexed and deformed so that the pressing force by the pressing portion 73a becomes uniform along the periphery.

According to this embodiment, the same effect as the first embodiment can be obtained.

Third Embodiment

Figure 11:
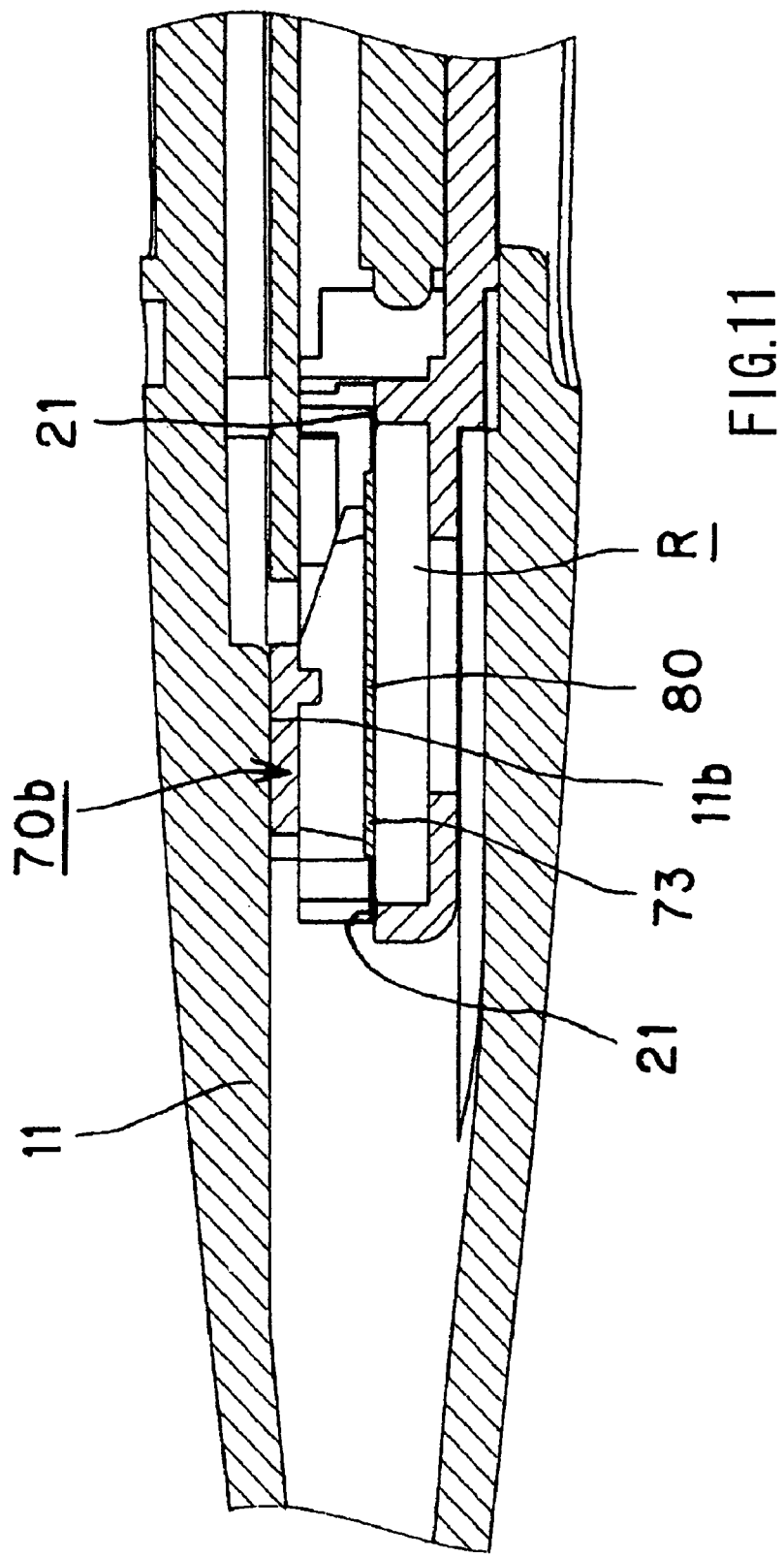
FIG. 11 is part of the sectional view in the longitudinal direction of the electronic thermometer according to a third embodiment of the present invention.
Figure 12:
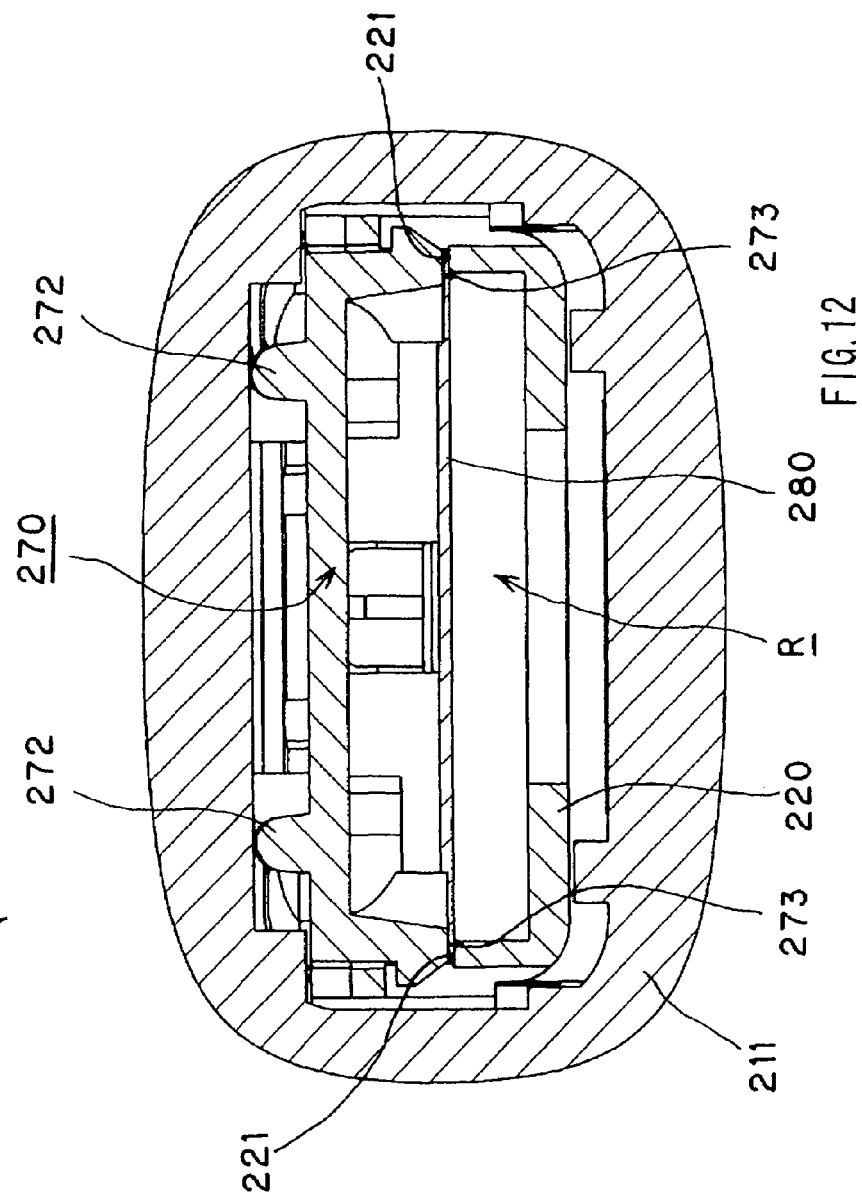
FIG. 12 is a sectional view of a conventional electronic thermometer.

FIG. 11 shows the third embodiment of the present invention. The first and second embodiments show an example of structure in which the buzzer cover as a pressing member is provided with the projecting portion and when this projecting portion makes contact with the inner wall face of the outer case, the buzzer cover is flexed. This embodiment shows an example of structure in which the inner wall face of the outer case is provided with the projecting portion and the buzzer cover is flexed by this projecting portion. Because the other structure and operation thereof are the same as the first embodiment, like reference numerals are attached to like components and description thereof will not be described. FIG. 11 shows part of a sectional view in the longitudinal direction of an electronic thermometer according to the third embodiment of the present invention. FIG. 11 shows a section at the same position as FIG. 9 of the first embodiment.

The buzzer cover 70b of this embodiment is different from the buzzer cover 70 of the first embodiment only in that it has no projecting portion 72 and the other structure thereof is equal to the buzzer cover 70. In this embodiment, the inner wall face of the outer case 11 is provided with the projecting portion 11b which flexes the buzzer cover 70b by pressing the vicinity of the center of the buzzer cover 70b when the buzzer cover 70b is mounted in the outer case 11.

Because in this embodiment also, the buzzer cover 70b is flexed like the buzzer cover 70 of the first embodiment, the same effect as the first embodiment can be obtained.

What is claimed is:

1. An electronic thermometer comprising:
    a temperature sensor which detects a temperature;
    a display portion which displays a measured temperature based on data detected by the temperature sensor;
    a buzzer which makes sound at least when the measurement is ended; and
    a control circuit including a circuit which controls the buzzer to make sound by determining a measurement end time and a circuit which processes data detected by the temperature sensor and displays the measurement temperature obtained by the processing on the display portion, wherein the buzzer comprises a vibration plate having opposite face sides, the vibration plate being fixed such that it is nipped from both face sides in the vicinity of the periphery of the vibration plate;
    a supporting portion which supports the vicinity of the periphery on one face of the vibration plate; and
    a pressing member having flexibility for pressing the vibration plate against the supporting portion by pressing the vicinity of the periphery of the other face of the vibration plate and further including a mechanism which presses the vicinity of the center of the pressing member on an opposite side to a side provided with the vibration plate so as to flex the pressing member, thereby pressing the vicinity of the periphery on the other face of the vibration plate due to a flexible reaction force of the pressing member.

2. An electronic thermometer according to claim 1, wherein
    the pressing member comprises a pair of pressing portions for pressing the vibration plate at two points at two ends in the width direction perpendicular to a longitudinal direction of an electronic thermometer main body and a projecting portion which projects to an opposite side to the pair of pressing portion in the vicinity of the center of the pressing member, and the projecting portion makes contact with an inner wall face of a casing of the electronic thermometer when the pressing member is mounted within the casing of the electronic thermometer so that the pressing member is flexed by a reaction force between the inner wall face of the casing and the projection portion.

3. An electronic thermometer according to claim 1, wherein the vibration plate is of disc shape and the pressing member comprises a substantially cylindrical pressing portion which presses the vibration plate at position along the periphery of the vibration plate and a projection portion which projects to an opposite side to the pressing portion in the vicinity of the center of the pressing member, and the projecting portion makes contact with an inner wall face of a casing of the electronic thermometer when the pressing member is mounted within the casing of the electronic thermometer so that the pressing member is flexed by a reaction force between the inner wall face of the casing and the projection portion.

4. An electronic thermometer according to claim 1, wherein an inner wall face of a casing of the electronic thermometer is provided with a projecting portion which when the pressing member is mounted within the casing, presses the vicinity of the center of the pressing member so as to flex the pressing member.

5. An electronic thermometer according to any one of claims 1 to 4, wherein the supporting portion which supports the vibration plate is provided on a case which forms resonant space resonating with vibration sound of the vibration plate, and the case has a sympathetic vibrating portion which vibrates with vibration of the vibration plate and a cutout for intensifying the sympathetic vibration effect of the sympathetic vibrating portion at a position which does not obstruct formation of the resonant space.

* * * * *